No. 802,759. PATENTED OCT. 24, 1905.
C. W. HOFFMAN.
SAFETY DEVICE FOR ELEVATORS.
APPLICATION FILED FEB. 11, 1905.
2 SHEETS—SHEET 2.
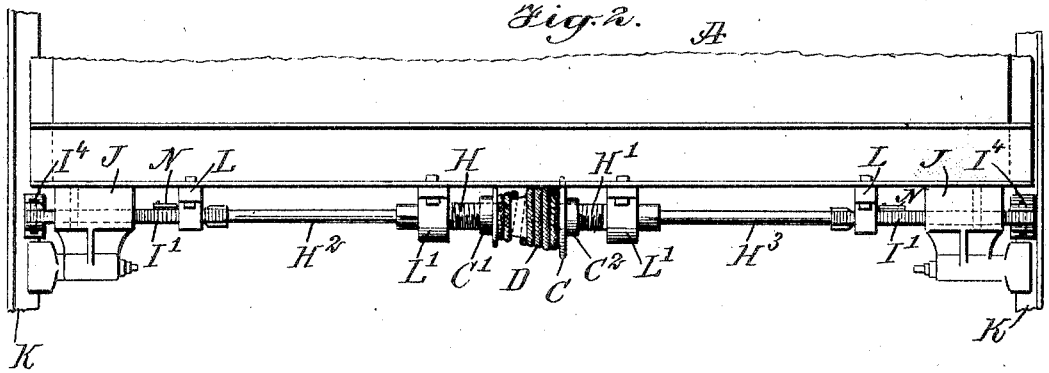
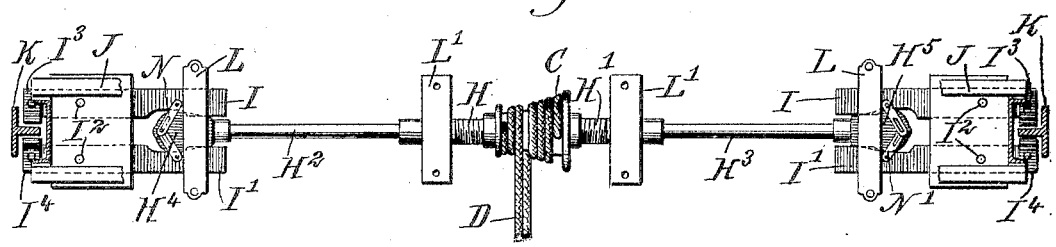
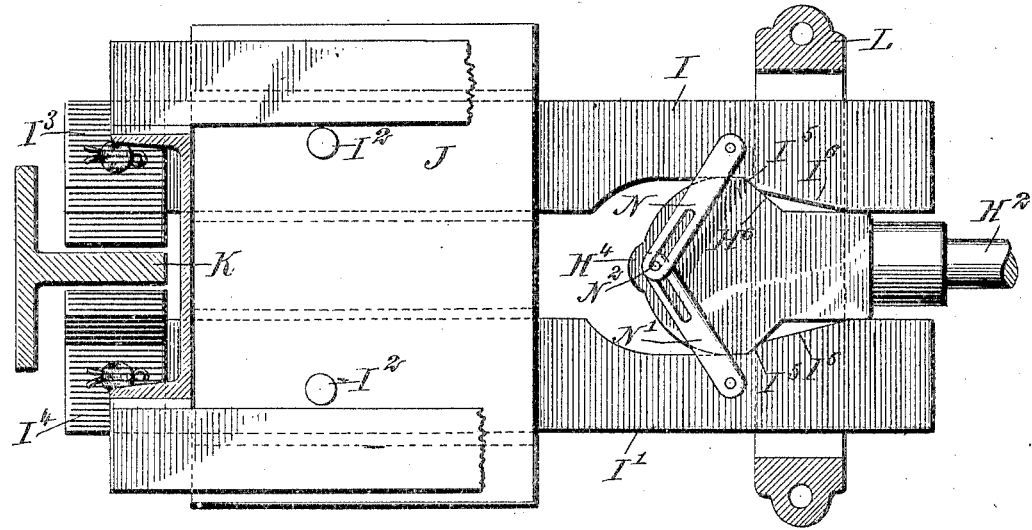
WITNESSES:
INVENTOR
Charles W. Hoffman
BY
ATTORNEYS

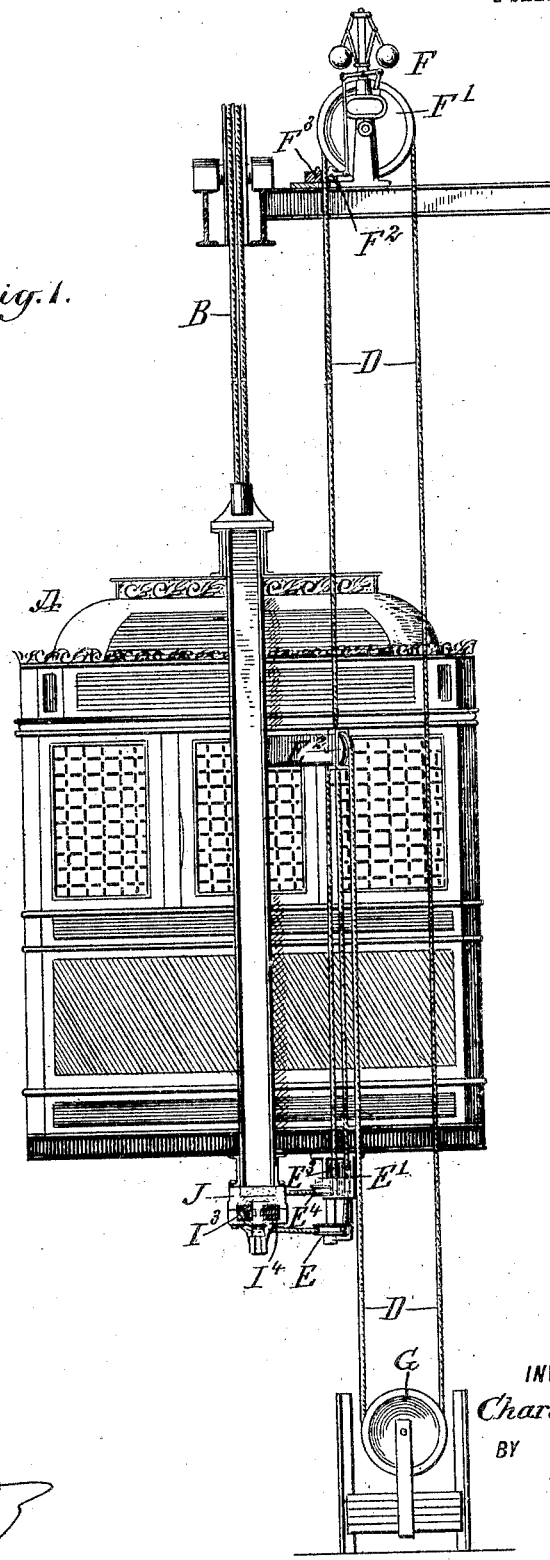

UNITED STATES PATENT OFFICE.

CHARLES W. HOFFMAN, OF NEW YORK, N. Y.

SAFETY DEVICE FOR ELEVATORS.

No. 802,759. Specification of Letters Patent. Patented Oct. 24, 1905.

Application filed February 11, 1905. Serial No. 245,220.

*To all whom it may concern:*

Be it known that I, CHARLES W. HOFFMAN, a citizen of the United States, and a resident of the city of New York, borough of Manhattan, in the county and State of New York, have invented a new and Improved Safety Device for Elevators, of which the following is a full, clear, and exact description.

The object of the invention is to provide a new and improved safety device for elevators arranged to insure quick application of the brake-shoes in case of accident, to prevent the cage from acquiring too much momentum by falling a great distance, and to then powerfully apply the brake-shoes to hold the cage in the initial position.

The invention consists of novel features and parts and combinations of the same, as will be more fully described hereinafter and then pointed out in the claims.

A practical embodiment of the invention is represented in the accompanying drawings, forming a part of this specification, in which similar characters of reference indicate corresponding parts in all the views.

Figure 1 is a side elevation of the improvement as applied. Fig. 2 is an enlarged side elevation of the improvement. Fig. 3 is a plan view of the same, and Fig. 4 is an enlarged plan view of part of the improvement.

The safety device illustrated in the drawings is shown applied to a cage A, hung on a suspension-cable B for raising or lowering the cage in the usual manner. On the under side of the cage A is arranged a conical drum or pulley C, on which are secured the ends of a safety rope or cable D for operating the safety device in case the cage travels at an abnormal rate of speed, the said safety-rope extending from the pulley C around idlers E and E', up to and around the pulley F' of a governor F of any approved construction adapted to actuate a clamping-jaw $F^2$ for pressing the safety-rope D against a fixed jaw $F^3$ whenever the cage A runs beyond a normal rate of speed. The safety-rope D, after passing around the pulley F', extends down and around a weighted pulley G and then up over an idler $E^2$ and down over idlers $E^3$ and $E^4$ back to the pulley C. The several idlers E, E', $E^2$, $E^3$, and $E^4$ are journaled on the cage A, so that the safety-rope D under normal conditions travels with the cage A, and thus rotates the pulley F' of the governor F.

The drum C is provided in the ends C' $C^2$ of its hub with right and left hand threads, in which screw the correspondingly-threaded ends H and H' of rods or stems $H^2$ and $H^3$, provided at their outer ends with heads $H^4$ and $H^5$ for actuating sets of levers I and I', fulcrumed at $I^2$ on brackets J, secured to the under side of the cage A, the said brake-levers I and I' carrying shoes $I^3$ and $I^4$ for engaging opposite sides of guides K, extending in the shaft of the elevator.

Each of the heads $H^4$ and $H^5$ is provided on opposite sides with bevels $H^6$, normally in engagement with abrupt inclines $I^5$, formed on the inner edges of the corresponding brake-levers I and I', (see Fig. 4,) the said bevels $H^6$ being also adapted to engage less abrupt inclines $I^6$, adjacent to the inclines $I^5$ and likewise formed on the inner edges of the brake-levers I and I'.

The brake-levers I and I', as well as the heads $H^4$ $H^5$, are supported in bearings L, attached to the under side of the cage A, and the inner ends of the stems or rods $H^2$ and $H^3$ are mounted in suitable bearings L', likewise attached to the under side of the cage A. Each set of brake-levers I and I' is held in engagement with the corresponding head $H^4$ $H^5$ by links N and N', pivotally connected with the levers and having their slotted ends engaging pins $N^2$, attached to the heads $H^4$ $H^5$.

The operation is as follows: Normally the shoes $I^3$ and $I^4$ on each set of brake-levers I and I' are out of engagement with the guides K; but in case of accident the brake-shoes $I^3$ and $I^4$ are moved in engagement with the guides K, so as to prevent the cage A from falling, it being understood that when the cage travels beyond a normal rate of speed then the governor F clamps the safety-rope D, so that the latter begins to turn the drum or pulley C, whereby the threaded ends H and H' of the rods $H^2$ and $H^3$ are screwed inward toward each other to move the heads $H^4$ and $H^5$ likewise inward for the bevels $H^6$ to act on the abrupt inclines $I^5$, so as to very quickly impart a swinging motion to the brake-levers I and I' for moving the brake-shoes $I^3$ and $I^4$ in contact with the guides K. The first turning motion given to the drum or pulley C is by that end of the safety-rope attached to the small end of the pulley, so that the latter is rotated very quickly, and consequently the heads $H^4$ and $H^5$ are quickly moved toward each other to impart a swinging motion to the brake-levers I and I' with a view to quickly move the brake-shoes $I^3$ and $I^4$ in engagement with the guides K to prevent the cage from falling a long distance, and thereby acquiring an undesirable momentum. Immediately after the quick application of the shoes I³ and I⁴ the heads H⁴ and H⁵ move in contact with the less abrupt inclines I⁶, and at this time the rope D begins to turn the drum or pulley C from the small end toward the base end thereof, so that the drum or pulley is more powerfully and more slowly turned to insure a very powerful application of the brake-shoes I³ and I⁴ on the guides K, with a view to firmly hold the cage in position. Thus from the foregoing it will be seen that when the safety device is thrown into action the brake-shoes I³ and I⁴ engage the guides K first quickly and immediately after that with a gradually-increasing force, so that during the first period the cage is prevented from falling a great distance and during the second period the cage is gradually brought to a stop and securely held against movement, thus preventing injury to the occupants in the cage.

The device is very simple and durable in construction and can be readily applied to the various makes of elevators now in use.

Having thus described my invention, I claim as new and desire to secure by Letters Patent—

1. An elevator provided with a braking device comprising a fixed guide, brake-levers for engaging the said guide, automatic means for actuating the said levers quickly to throw the same into engagement with the guide, means for subsequently actuating the levers slowly and more powerfully, to hold the levers with increasing power applied on the said guide, and means whereby the lever-actuating means may be moved at first quickly and more slowly thereafter.

2. A safety device for elevators, comprising brake-levers on the elevator-cage, each having adjacent inclines, one more abrupt than the other, a head having a bevel in engagement with the abrupt incline and adapted to move subsequently in engagement with the less abrupt incline, means for automatically moving the said head, for the latter to act first on the abrupt incline and subsequently on the less abrupt incline, means to gradually increase the speed of movement of the head.

3. A safety device for elevators, comprising brake-levers on the elevator-cage, each having adjacent inclines, one more abrupt than the other, a head having a bevel in engagement with the abrupt incline and adapted to move subsequently in engagement with the less abrupt incline, and means for automatically shifting the said head, for the latter to act first on the abrupt incline and subsequently on the less abrupt incline, the said means being actuated first quickly and then more slowly and more powerfully.

4. A safety device for elevators, comprising brake-levers on the elevator-cage, each having adjacent inclines, one more abrupt than the other, a head having a bevel in engagement with the abrupt incline and adapted to move subsequently in engagement with the less abrupt incline, and means for automatically shifting the said head, for the latter to act first on the abrupt incline and subsequently on the less abrupt incline, and means whereby the head may be moved at a relatively high speed at the commencement of its travel and at a relatively low speed thereafter.

5. A safety device for elevators, comprising brake-levers on the elevator-cage, each having adjacent inclines, one more abrupt than the other, a head having a bevel in engagement with the abrupt incline and adapted to move subsequently in engagement with the less abrupt incline, a conical pulley having a nut in which screws the threaded end of the stem of the said head, and an operating-rope fixed at its ends on the said conical pulley and winding thereon.

6. In an elevator the combination of a car, a suspension-cable therefor and braking mechanism comprising fixed guides, brake-levers on the car for engaging the guides each having adjacent inclines, one more abrupt than the other, heads having a bevel for engaging the abrupt incline and for subsequently engaging the less abrupt incline, means for moving the heads comprising shafts attached to the heads and provided with screw-threaded inner ends, a conical drum having longitudinal screw-threaded openings for engaging the screw-threaded ends of the first-named shafts, and an operating-rope having its ends secured to the drum and winding thereon.

7. In an elevator, the combination of a car, a suspension-cable therefor, and braking mechanism comprising fixed guides, brake-levers on the car for engaging the guides, each having adjacent inclines, one more abrupt than the other, heads having a bevel for engaging the abrupt inclines, and for subsequently engaging the less abrupt inclines, means for moving the heads, comprising shafts attached to the heads, and provided with screw-threaded inner ends, a conical drum having longitudinal screw-threaded openings to engage the screw-threaded ends, an operating-rope having its ends secured to the drum and winding thereon, and means connected with the heads for returning the brake-levers to their normal position.

8. In an elevator the combination of the car, a suspension-cable therefor, braking mechanism comprising fixed guides, brake-levers on the car for engaging the guides, and each having adjacent inclines, one more abrupt than the other, heads having a bevel for engaging the abrupt inclines and for subsequently engaging the less abrupt inclines, means for moving the head comprising shafts attached to the head and provided with screw-threaded inner ends, a conical drum having longitudinal screw-threaded openings to engage the screw-threaded ends of the shafts, an operating-rope having its ends secured to the drum and winding thereon, and means for returning the brake-levers to their normal position comprising links pivoted to the brake-levers and provided with slots at their free ends, and a pin on the heads engaging the slots.

In testimony whereof I have signed my name to this specification in the presence of two subscribing witnesses.

CHARLES W. HOFFMAN.

Witnesses:
    THEO. G. HOSTER,
    EVERARD BOLTON MARSHALL.